Patented Feb. 5, 1946

2,394,493

UNITED STATES PATENT OFFICE 2,394,493

COLORED GLASS FIBERS

Robert A. Schoenlaub, Tiffin, Ohio, assignor to Owens-Corning Fiberglas Corporation, a corporation of Delaware No Drawing. Application November 6, 1942, Serial No. 464,933

13 Claims. (Cl. 106—50)

The present invention relates to colored glass fibers and compositions for forming the same, and more specifically to the production of intense colors in extremely fine glass fibers. The colors may extend through a range running from a bright henna through mahogany and brown to black.

Heretofore various attempts have been made to produce fine glass filaments having a color such as a deep brown in which red is a contributing component. Such attempts have thus far been unsuccessful inasmuch as the apparent color of the glass from which the fibers are attenuated is not an indication of the resultant color of the attenuated fibers. I have found that in order to attain the same apparent color in the glass filaments as in bulk glass, the color density of the glass in filamentary form must ordinarily be about two hundred times that of the glass in bulk form. Glass which may have a relatively great color density in bulk form upon being attenuated into fibers ordinarily becomes white or only faintly colored.

Ingredients which have heretofore been employed in the glass batch for producing colors are various oxides such as those of cobalt, copper, iron, manganese, and others. The resultant colors in the attenuated fibers or filaments using these ingredients have been limited to various lighter shades of blue and green and only to extremely light shades of brown hardly recognizable as such and leaning rather to a cream or tan color than to actual brown. Any attempt to increase the percentage of the coloring oxide in order to deepen the color of the attenuated filaments has met with failure inasmuch as the oxides employed are strongly basic in composition and when added to the glass in quantities sufficient to produce the lighter shades above mentioned reach the normal chemical tolerance of the glass for such bases. Any increase of the oxides over a certain percentage materially decreases the viscosity of the glass at the usual attenuating temperatures while at the same time increasing the rate and temperature of devitrification. As a consequence, attenuation of fibers from the batch is extremely difficult if not impossible and such fibers or filaments as may be produced under the circumstances are not well suited for textile use because of their low durability.

Utilizing the oxides just mentioned, and at the relatively high percentages set forth, the copper, iron and manganese oxides have shown a tendency to produce lighter colors than cobalt oxide. The latter produces the only really satisfactory color as far as color depth in the fibers is concerned, the color of the attenuated fibers running, at high percentages of this oxide, to a medium blue.

The principal object of the present invention is to produce a glass composition suitable for the attenuation of fibers which will produce in the fibers relatively great color densities ranging from a bright henna, through various shades of brown such as red brown, mahogany, dark brown, to black. Such shades in the attenuated fibers have heretofore been unknown or at least impossible with the usual known coloring oxides.

In carrying out the above mentioned object, I have found that vanadium oxide in certain vitreous chemical environments will permit the production of fi'aments of intense shades ranging from red, through the various shades of brown, to black. I have also found that vanadium oxide may be added freely to the glass batch without decreasing the normal tolerance of the glass for the usual copper, iron and manganese oxides, and thus these other oxides may be utilized in combination with vanadium oxide up to the normal tolerance of the glass for these oxides alone. By so combining the usual coloring oxides of copper, iron, manganese and others with vanadium oxide in the glass batch, various modifications in color may be attained all of which may be carried to very deep co'or densities without destroying the chemical attributes of the glass by means of which satisfactory attenuation may take place.

Not only does vanadium oxide have no apparent effect upon the chemical attributes of the glass batch, but it is the only known coloring oxide which functions in its vitreous surroundings as an acid substance such as the non-coloring silica, phosphoric or boron oxides. It can therefore be used freely in combination with the usual coloring oxides to obtain extreme color densities not possible with those oxides alone.

Vanadium oxide has additional advantages as a coloring agent in that it lowers the liquidus curve of the multiple component solution in the batch or in other words materially increases the cohesiveness of the molecular structure of the glass while at the same time the oxide renders the same more or less insensible to either a reducing or an oxidizing atmosphere.

In practice, the vanadium oxide may be added to the batch as the sole coloring agent and in such an instance an extremely red brown or henna color will result in the attenuated fibers. If iron oxide is included in the batch a less red and darker brown will result depending upon the percentage of the oxide employed. Similarly the addition of copper oxide to the batch will produce a rich mahogany color in the attenuated fibers. By replacing the usual divalent bases in the batch by the usual copper, iron and manganese oxides in combination with a suitable quantity of vanadium oxide, a black color of a density even greater than that required to produce black fibers in the attenuated filaments will result.

I have also discovered that a major improvement in color intensity may be effected by utilizing the vanadium oxide ingredient in an alkali-free glass. The presence of alkalies such as potassium or sodium oxide has a weakening effect on color density and accordingly I recommend its omission.

Lithia, while in the alkali group, may be used in relatively small quantities to improve melting characteristics without serious weakening of color intensity.

In the accompanying table I have shown, for illustrative purposes only, several compositions of a glass batch utilizing vanadium oxide as a coloring agent to produce relatively deep colors in the ultimate attenuated filaments:

| Composition | Color of filaments | | | | |
|---|---|---|---|---|---|
| | Henna | Deep henna | Brown | Mahogany | Black |
| | Per cent | Per cent | Per cent | Per cent | Per cent |
| $SiO_2$ | 50.0 | 60.0 | 60.0 | 55.0 | 53.0 |
| $Al_2O_3$ | 15.0 | 10.0 | 10.0 | 10.0 | 8.0 |
| CaO | 12.0 | 12.0 | 8.0 | 9.0 | |
| MgO | 2.0 | 5.0 | 5.0 | 4.0 | |
| $B_2O_3$ | 10.0 | | | | |
| $Li_2O$ | | 2.0 | 2.0 | 2.0 | 4.0 |
| CoO | | | | | 5.0 |
| CuO | | | | 9.0 | 8.0 |
| MnO | | | | | 4.0 |
| $Fe_2O_3$ | | | 4.0 | | 3.0 |
| $V_2O_3$ | 11.0 | 11.0 | 11.0 | 11.0 | 15.0 |
| | 100 | 100 | 100 | 100 | 100 |

It is to be noted that in each of the above compositions I have selected an alkali-free glass or at least a glass which is of very low alkali content. In many instances I have utilized a lithia glass on account of the excellent attenuating characteristics of the same. The above examples employ vanadium oxide in amounts of 11% and 15% indicating a range of about 10 to 15%, but it has been found possible to use from 1 to 20% vanadium oxide depending upon the color intensity desired and the chemical tolerance of the glass for the other coloring oxides such as those of iron, copper, etc.

The invention is not to be limited to the exact proportions of the ingredients set forth in the above table or to the ingredients themselves inasmuch as these proportions and ingredients may be varied or altered within the limits of practicability. Certain of the ingredients tabulated may be dispensed with if desired or others substituted in their stead. The essential features of the invention are set forth in the accompanying claims.

I claim:

1. A vitreous composition of matter suitable in the production of colored fibers by an attenuating process comprising an alkali-free glass containing from 10 to 20% vanadium oxide.

2. A glass batch suitable for the production of colored fibers by an attenuating process containing from 10 to 15% vanadium oxide.

3. A vitreous composition of matter suitable as a glass batch in the production of colored fibers by an attenuating process, said composition being free from the oxides of sodium, potassium and lithium and containing from 10 to 20% of vanadium oxide.

4. A glass batch suitable for the production of colored fibers by an attenuating process containing up to 5% lithium oxide in combination with vanadium oxide from 10 to 20%.

5. A glass composition containing from 10 to 20% vanadium oxide and lithium oxide with the latter oxide ranging from 1 to 5%.

6. A glass batch of the character described containing from 10 to 20% vanadium oxide and in which the oxides of elements in the potassium group are present in an amount less than 5%.

7. A glass batch of the character described containing 10 to 20% vanadium oxide in combination with copper oxide.

8. A glass batch of the character described containing 10 to 20% vanadium oxide in combination with iron oxide.

9. A glass batch of the character described containing 10 to 20% vanadium oxide in combination with copper and iron oxides.

10. A vitreous composition of matter suitable as a glass batch in the production of substantially black fibers by an attenuating process, comprising a substantially alkali-free glass containing from 10 to 20% vanadium oxide in combination with oxide selected from the group consisting of manganese, cobalt, copper, and iron.

11. A relatively fine glass fiber suitable for textile use formed of a substantially alkali-free glass containing from 10 to 15% vanadium oxide together with oxide selected from the group consisting of manganese, cobalt, copper, and iron.

12. A vitreous composition of matter suitable as a glass for the production of fibers by an attenuating process containing from 10 to 20% vanadium oxide together with coloring oxide from the group consisting of manganese, copper, cobalt, and iron, and an alkali-metal oxide in a range of 1 to 5%.

13. A fine glass fiber suitable for textile use formed of a substantially alkali-free glass containing from 10 to 20% vanadium oxide.

ROBERT A. SCHOENLAUB.